(12) United States Patent
Roman et al.

(10) Patent No.: US 6,591,316 B1
(45) Date of Patent: Jul. 8, 2003

(54) AVOIDING FRAGMENTATION LOSS IN HIGH SPEED BURST ORIENTED PACKET MEMORY INTERFACE

(75) Inventors: Peter Roman, Freemont, CA (US); Jeff Tuckey, Campbell, CA (US); Parthiban Kandappan, Milpitas, CA (US)

(73) Assignee: Marconi Communications, Inc., Warrendale, PA (US)

( * ) Notice: Subject to any disclaimer, the term of this patent is extended or adjusted under 35 U.S.C. 154(b) by 0 days.

(21) Appl. No.: 09/315,275

(22) Filed: May 20, 1999

(51) Int. Cl.[7] ................................................ G06F 3/00
(52) U.S. Cl. ......................... 710/52; 710/33; 710/57; 711/118
(58) Field of Search ............................ 710/52, 20, 36, 710/53, 54, 57, 33, 56; 370/60, 392; 709/213, 212, 214, 215; 712/225, 43; 711/122, 118

(56) References Cited

U.S. PATENT DOCUMENTS

| | | | | |
|---|---|---|---|---|
| 5,235,595 A | * | 8/1993 | O'Dowd .................... | 370/94.1 |
| 5,347,514 A | * | 9/1994 | Davis et al. ................. | 370/60 |
| 5,367,643 A | * | 11/1994 | Chang et al. ............... | 395/325 |
| 5,526,508 A | * | 6/1996 | Park et al. .................. | 711/122 |
| 5,634,015 A | * | 5/1997 | Chang et al. ............... | 395/309 |
| 5,701,482 A | * | 12/1997 | Harrison et al. ............. | 709/105 |
| 5,748,622 A | * | 5/1998 | Garcia Vacas .............. | 370/337 |
| 5,978,578 A | * | 11/1999 | Azarya et al. ................ | 717/2 |
| 5,978,852 A | * | 11/1999 | Myrick et al. .............. | 709/238 |
| 6,012,109 A | * | 1/2000 | Schultz ........................ | 710/56 |
| 6,018,763 A | * | 1/2000 | Hughes et al. .............. | 709/213 |
| 6,034,957 A | * | 3/2000 | Haddock et al. ............ | 370/392 |
| 6,067,318 A | * | 5/2000 | Bailey et al. ............... | 395/500 |

* cited by examiner

*Primary Examiner*—Jeffrey Gaffin
*Assistant Examiner*—Rijue Mai
(74) *Attorney, Agent, or Firm*—Ansel M. Schwartz

(57) ABSTRACT

A packet memory interface. The interface includes an input mechanism which receives related data. The interface includes an output mechanism which transmits the data. The interface includes a mechanism for transferring at least a plurality of bytes of the data in each burst of a plurality of bursts from the input mechanism to the output mechanism without fragmentation loss in each burst. A method for transferring data through a packet memory interface. The method includes the steps of receiving data of the packet at an input mechanism of the interface. Then there is the step of transferring at least a plurality of bytes of data of the packet to an output mechanism in bursts without any fragmentation loss in the bursts.

14 Claims, 1 Drawing Sheet

AVOIDING FRAGMENTATION LOSS IN HIGH SPEED BURST ORIENTED PACKET MEMORY INTERFACE

FIELD OF THE INVENTION

The present invention is related to avoiding fragmentation loss in a high speed burst oriented packet memory interface. More specifically, the present invention is related to avoiding fragmentation loss in a high speed burst oriented packet memory interface having a bypass path.

BACKGROUND OF THE INVENTION

Packet memory interfaces usually transfer data from a controller, for example, an ASIC to a high density memory used as a buffer, for temporary storage. This transfer normally occurs in a burst oriented manner to maximize transfer rates and efficiently utilize the high speed and bandwidth available. An optimal burst size is chosen for a given design based on several criteria such as bus width, command/control overhead, bus turn-around dead cycles, RAS/CAS latencies, etc.

However, this burst transfer mechanism results in fragmentation loss. Fragmentation loss is the amount of bandwidth lost when there is some data available to transfer to buffer memory, but not enough to completely occupy the burst.

Consider the case of Ethernet packets, which can range from 60 bytes (excluding CRC, which is stripped off by the MAC and never enters the rest of the switch) to 1514 bytes. As described earlier, an optimal burst size is chosen. Let us assume that this size is 96 bytes. Since packets don't always arrive in such a convenient size, two options are available:

- Slice each packet into 96 byte bursts, with the last burst padded with dummy values.
- Slice packets into 96 byte bursts, ignoring packet boundaries. In other words, the last few bytes of a packet are padded with the leading bytes from the next packet.

The first option leads to an unacceptable level of fragmentation overhead. In the worst case of a continuous stream of 97 byte packets, for example, the effective bandwidth allocated to a channel would drop by approximately 50 percent. Hence, the second option is chosen to help maintain the effective bandwidth.

However, this introduces a complexity. Since bursts into the buffer memory happen only when 96 bytes of data have been accumulated in an input FIFO, it is possible that the last few bytes of a packet will stay resident in the FIFO for long periods of time. If a packet is not transferred to the buffer memory, the transmit logic will not be able to schedule that packet for transmission.

SUMMARY OF THE INVENTION

The present invention pertains to a packet memory interface. The interface comprises an input mechanism which receives related data. The interface comprises an output mechanism which transmits the data. The interface comprises a mechanism for transferring at least a plurality of bytes of the data in each burst of a plurality of bursts from the input mechanism to the output mechanism without fragmentation loss in each burst.

The present invention pertains to a method for transferring data through a packet memory interface. The method comprises the steps of receiving data of the packet at an input mechanism of the interface. Then there is the step of transferring at least a plurality of bytes of data of the packet to an output mechanism in bursts without any fragmentation loss in the bursts.

BRIEF DESCRIPTION OF THE DRAWINGS

In the accompanying drawings, the preferred embodiment of the invention and preferred methods of practicing the invention are illustrated in which.

DETAILED DESCRIPTION

Figure 1:
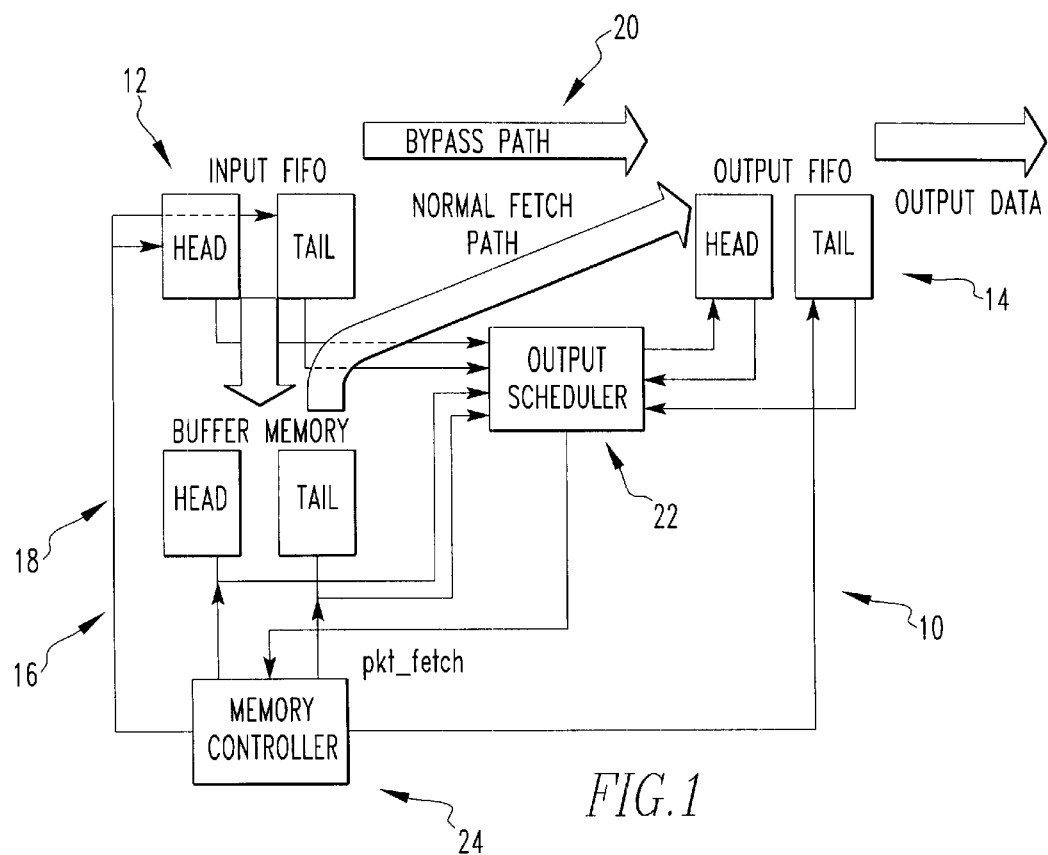
FIG. 1 is a schematic representation of an interface of the present invention.

Referring now to the drawings wherein like reference numerals refer to similar or identical parts throughout the several views, and more specifically to FIG. 1 thereof, there is shown a packet memory interface 10. The interface 10 comprises an input mechanism 12 which receives related data. The interface 10 comprises an output mechanism 14 which transmits the data. The interface 10 comprises a mechanism for transferring at least a plurality of bytes of the data in each burst of a plurality of bursts from the input mechanism 12 to the output mechanism 14 without fragmentation loss in each burst.

Preferably, the transferring mechanism 16 includes a buffer memory 18 connected to the input mechanism 12 and the output mechanism 14 which receives the plurality of bursts of data from the input mechanism 12. The buffer memory 18 preferably is connected to the output mechanism 14. The output mechanism 14 receives bursts of data from the buffer memory 18. Preferably, the transfer mechanism includes a bypass path 20 connected to the input mechanism 12 and the output mechanism 14 along which data transfers directly from the input mechanism 12 to the output mechanism 14 when there is not enough data in the input mechanism 12 to fill a burst.

The transfer mechanism preferably includes an output scheduler 22 connected to the input mechanism 12, output mechanism 14 and buffer memory 18, which monitors the data in the input mechanism 12 and causes data to transfer directly from the input mechanism 12 to the output mechanism 14 along the bypass path 20 when there is not enough data in the input mechanism 12 to fill a burst and there is no data in the buffer memory 18 associated with the data in the input mechanism 12.

Preferably, the transferring mechanism 16 includes a memory controller 24 connected to the output scheduler 22, output mechanism 14, buffer memory 18 and input mechanism 12 and which transfers the data in bursts from the input mechanism 12 or from the buffer memory 18 at the direction of the output scheduler 22. The input mechanism 12 preferably includes an input FIFO which receives the data of a packet. Preferably, the output mechanism 14 includes an output FIFO which transmits the data of the packet. The output scheduler 22 preferably causes data to transfer directly from the input FIFO to the output FIFO along the bypass path 20 when there is not enough data of the packet in the input FIFO to fill a burst and there is no data in the buffer memory 18 associated with the packet.

The present invention pertains to a method for transferring data through a packet memory interface 10. The method comprises the steps of receiving data of the packet at an input mechanism 12 of the interface 10. Then there is the step of transferring at least a plurality of bytes of data of the packet to an output mechanism 14 in bursts without any fragmentation loss in the bursts.

Preferably, the data transferring step includes the step of transferring the data in bursts to a buffer memory 18 when the data in the input mechanism 12 completely fills a burst. The data transferring step preferably includes the step of transferring the data from the buffer memory 18 to the output mechanism 14 at the direction of an output scheduler 22 of the interface 10. Preferably, the data transferring step includes the step of monitoring the data received at the input mechanism 12 with the output scheduler 22.

The transferring step preferably includes the step of transferring data from the input mechanism 12 to the output mechanism 14 directly through a bypass path 20 when there is no data in the buffer memory 18 of the packet to transfer to the output mechanism 14 but there is data in the input mechanism 12 for the packet which does not fill a burst. Preferably, after the transferring step, there is the step of terminating the bypass transfer 20 when there is no data of the packet in the output mechanism 14 or the buffer memory 18. Note, this does not address the issue of packet delineation as this may be accomplished easily by means of any of many well known methods such as byte counts or start of packet/end of packet control bits.

In the operation of the preferred embodiment, the logic of the interface 10 provides for a bypass mechanism. FIG. 1 shows a block diagram of the logic implemented in support of the interface 10. Data of a packet is received at the input FIFO and read into the buffer memory 18 under the control of the memory controller 24 and its presence is noted in the output scheduler 22. When the output scheduler 22 desires to transmit a packet, the logic checks its buffer memory 18 pointers to determine if a burst is available in memory. If a burst is available, the burst is sent over the normal fetch path to the output FIFO. If the buffer for the request is empty, the logic determines that the output scheduler 22 is requesting a bypass. The logic then pipes the data directly from the input FIFO to the appropriate output FIFO along the bypass path 20; if the input FIFO runs empty, it is interpreted as an end of packet and the logic terminates the bypass transfer.

Thus, fragments (or packets) that would result in bandwidth loss are passed through the bypass mechanism, eliminating fragmentation loss in the buffer memory 18 interface 10.

Although the invention has been described in detail in the foregoing embodiments for the purpose of illustration, it is to be understood that such detail is solely for that purpose and that variations can be made therein by those skilled in the art without departing from the spirit and scope of the invention except as it may be described by the following claims.

What is claimed is:

1. A packet memory interface comprising:
   an input mechanism which receives related data;
   an output mechanism which transmits the data; and
   a mechanism for transferring at least a plurality of bytes of the data in each burst of a plurality of bursts from the input mechanism to the output mechanism without fragmentation loss in each burst, the transfer mechanism includes a bypass path connected to the input mechanism and the output mechanism along which data transfers directly from the input mechanism to the output mechanism when there is not enough data in the input mechanism to fill a burst.

2. An interface as described in claim 1 wherein the transferring mechanism includes a buffer memory connected to the input mechanism and the output mechanism which receives the plurality of bursts of data from the input mechanism.

3. An interface as described in claim 2 wherein the buffer memory is connected to the output mechanism and the output mechanism receives bursts of data from the buffer memory.

4. An interface as described in claim 3 wherein the transfer mechanism includes an output scheduler connected to the input mechanism, output mechanism and buffer memory, which monitors the data in the input mechanism and causes data to transfer directly from the input mechanism to the output mechanism along the bypass path when there is not enough data in the input mechanism to fill a burst and there is no data in the buffer memory associated with the data in the input mechanism.

5. An interface as described in claim 4 wherein the transferring mechanism includes a memory controller connected to the output scheduler, output mechanism, buffer memory and input mechanism and which transfers the data in bursts from the input mechanism or from the buffer memory at the direction of the output scheduler.

6. An interface as described in claim 5 wherein the input mechanism includes an input FIFO which receives the data of a packet.

7. An interface as described in claim 6 wherein the output mechanism includes an output FIFO which transmits the data of the packet.

8. An interface is described in claim 7 wherein the output scheduler causes data to transfer directly from the input FIFO to the output FIFO along the bypass path when there is not enough data of the packet in the input FIFO to fill a burst and there is no data in the buffer memory associated with the packet.

9. A method for transferring data through a packet memory interface comprising the steps of:
   receiving data of the packet at an input mechanism of the interface;
   transferring at least a plurality of bytes of data of the packet to an output mechanism in bursts without any fragmentation loss in the bursts; and
   transferring data from the input mechanism to the output mechanism directly through a bypass path when there is not enough data in the input mechanism of the packet to transfer to the output mechanism to fill a burst but there is data in the input mechanism for the packet which does not fill a burst.

10. A method as described in claim 9 wherein the data transferring step includes the step of transferring the data in bursts to a buffer memory when the data in the input mechanism completely fills a burst.

11. A method as described in claim 10 wherein the data transferring step includes the step of transferring the data from the buffer memory to the output mechanism at the direction of an output scheduler of the interface.

12. A method as described in claim 11 wherein the data transferring step includes the step of monitoring the data received at the input mechanism with the output scheduler.

13. A method as described in claim 12 wherein the transferring step includes the step of transferring data from the input mechanism to the output mechanism directly through a bypass path when there is no data in the buffer memory of the packet to transfer to the output mechanism but there is data in the input mechanism for the packet which does not fill a burst.

14. A method as described in claim 13 wherein after the transferring step, there is the step of terminating the bypass path when there is no data of the packet in the output mechanism or the buffer memory.

* * * * *